US010548329B2

(12) United States Patent
Mach et al.

(10) Patent No.: US 10,548,329 B2
(45) Date of Patent: Feb. 4, 2020

(54) APPARATUS FOR DIVIDING UP TUBULAR CASES

(71) Applicant: VEMAG Maschinenbau GmbH, Verden/Aller (DE)

(72) Inventors: Matthias Mach, Hannover (DE); Jan-Nils Hagedorn, Verden (DE); Heiner Matthies, Kalbe (DE); Olaf Grote, Eystrup (DE); Alexander Lewin, Verden (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 0 days.

(21) Appl. No.: 16/116,208

(22) Filed: Aug. 29, 2018

(65) Prior Publication Data

US 2019/0059403 A1    Feb. 28, 2019

(30) Foreign Application Priority Data

Aug. 31, 2017   (DE) .......................... 10 2017 120 101

(51) Int. Cl.
*A22C 11/00* (2006.01)
*A22C 11/10* (2006.01)
*A22C 11/02* (2006.01)

(52) U.S. Cl.
CPC ............ *A22C 11/107* (2013.01); *A22C 11/02* (2013.01)

(58) Field of Classification Search
CPC ..... A22C 11/00; A22C 11/001; A22C 11/008; A22C 11/02; A22C 11/0209; A22C 11/0218; A22C 11/10

(Continued)

(56) References Cited

U.S. PATENT DOCUMENTS 3,115,668 A    12/1963  Townsend
3,540,075 A *  11/1970  Menne ................. A22C 11/107
                                                      452/47

(Continued)

FOREIGN PATENT DOCUMENTS

DE      1432559 A1    5/1969
DE    19629047 A1    1/1997

(Continued)

OTHER PUBLICATIONS

German Patent Office, Office Action in DE 10 2017 120 101.7 dated Jan. 10, 2019 (3 pages).

(Continued)

*Primary Examiner* — Richard T Price, Jr.
(74) *Attorney, Agent, or Firm* — Wood Herron & Evans LLP

(57) ABSTRACT

An apparatus is provided for dividing up tubular cases which are filled with a pasty material such as sausage meat. The dividing apparatus includes two circulating transport elements arranged on mutually opposite sides of the case, and the transport elements respectively include one or more dividing elements and a plurality of guide parts, and at least one drive device for the transport elements. The dividing elements are so arranged at the transport elements and are so guided along the case that only one pair of dividing elements can be simultaneously brought into engagement with the case. The dividing apparatus can create various lengths of filled cases with minimal complexity.

13 Claims, 6 Drawing Sheets

(58) Field of Classification Search
USPC .......... 452/21–26, 30–32, 35–37, 46–48, 51
See application file for complete search history.

(56) References Cited

U.S. PATENT DOCUMENTS

| | | | | |
|---|---|---|---|---|
| 5,147,239 | A * | 9/1992 | Staudenrausch | A22C 11/10 452/47 |
| 5,788,563 | A | 8/1998 | Nakamura et al. | |
| 5,830,051 | A * | 11/1998 | Kasai | A22C 11/108 452/48 |
| 6,080,054 | A * | 6/2000 | Muller | A22C 11/006 452/29 |
| 6,439,990 | B1 * | 8/2002 | Kasai | A22C 11/107 452/46 |
| 6,514,134 | B1 * | 2/2003 | Krompholz | A22C 11/107 452/30 |
| 7,381,123 | B2 * | 6/2008 | Bachtle | A22C 11/107 452/46 |
| 7,704,131 | B1 * | 4/2010 | Malenke | A22C 11/107 452/46 |
| 8,641,484 | B1 * | 2/2014 | Weers | A22C 11/107 452/46 |

FOREIGN PATENT DOCUMENTS

| | | |
|---|---|---|
| DE | 19952102 A1 | 5/2001 |
| DE | 10115466 A1 | 10/2001 |
| EP | 0868852 A2 | 10/1998 |
| EP | 0868852 A3 | 5/2000 |
| EP | 1430779 B1 | 11/2006 |
| EP | 1902622 B1 | 1/2009 |
| WO | 9641539 A1 | 12/1996 |

OTHER PUBLICATIONS

European Patent Office, Search Report issued in EP 18192083.6-1011 dated Jan. 22, 2019 (9 pages).

* cited by examiner

APPARATUS FOR DIVIDING UP TUBULAR CASES

CROSS-REFERENCE TO RELATED APPLICATION

This application claims priority to German Application No. 10 2017 120 101.7, filed Aug. 31, 2017. The above-mentioned patent application is incorporated herein by reference in its entirety.

TECHNICAL FIELD

The invention relates to an apparatus for dividing up tubular cases. The invention further concerns a filling machine for producing sausages of pasty material, in particular sausage meat.

BACKGROUND

Apparatuses for dividing up tubular cases are used in conjunction with filling machines for the production of tubular cases which are to be subdivided into string portions like sausage strings. The apparatuses for dividing up the cases, also referred to as a dividing apparatus, are used to subdivide a case filled with a pasty material, in particular with a meat product, of constant diameter, into portions of a predetermined length. The operation of dividing up the string portions is conducted for example, like the operation of filling the case, with the case being continuously moving. During the dividing operation a constriction is produced in the filled case and one of the portions of the case beside the constriction is rotated about the longitudinal axis thereof so that a twisting-off location is formed in the region of the constriction. To prevent the case of the string portion which has just been divided off also rotating the case is so greatly constricted in the region of the dividing or twisting-off location that the case material is clamped in the region of the dividing location to such an extent that it is prevented from also rotating.

For that purpose, the known dividing apparatuses have two circulating transport elements arranged on mutually opposite sides of the case. The transport elements each include one or more dividing elements, with which the constriction between the string portions to be produced is generated and the case is clamped in controlled fashion. Two dividing elements at the transport elements respectively form a pair of dividing elements. In addition, the apparatus includes at least one drive device for the transport elements, which move the transport elements and the dividing elements at least arranged thereon at almost a uniform speed during engagement of the dividing elements with the case.

One example of a conventional apparatus is shown in EP 1 430 779 B1, which discloses for example an apparatus for dividing tubular cases having two transport elements. Arranged along the transport elements at predetermined spacings are a plurality of dividing elements, wherein guide parts for the tubular case to be conveyed with their string portions are provided between two adjacent dividing elements. The length of the string portions which correspond at the end of a finished sausage length is in that case dependent on the spacing between mutually adjacent dividing elements at the transport elements. Only those sausage lengths can be produced which, in relation to the overall length of the transport element, correspond to whole-numbered division by the dividing elements. Without modifications to or replacement of the transport elements the sausage lengths cannot be varied during the production operation. In that case two pairs of dividing elements of the transport elements simultaneously engage the filled tubular case.

In another conventional apparatus, EP 1 902 622 B1 discloses a dividing apparatus which, instead of the fixed arrangement of the dividing elements along the transport elements, provides dividing elements which are accommodated on the transport element at a variable spacing relative to each other. For that purpose, each transport element has a plurality of transport elements which are drivable independently of each other, each having correspondingly associated pairs of dividing elements. To produce different sausage length, the various pairs of transport elements are drivable by way of various drives respectively coupled thereto at appropriately matched speeds. In that way string portions can be produced at the tubular case which is filled with a meat product, the lengths of which string portions are variably adjustable. The known apparatus for dividing sausage portions of variable length however is of a highly complex configuration and requires complicated actuation of the various pairs of transport elements at the transport elements. In addition, the pairs of transport elements are exposed to high levels of acceleration by virtue of the drives to be cyclically controlled, and such acceleration makes the production process which usually takes place continuously difficult to adjust and control.

DE 199 52 102 A1 or U.S. Pat. No. 6,439,990 B1 each disclose apparatuses for producing string-like foodstuffs. The apparatus has a filling tube or filling nozzle, on which a gathered case is arranged. Disposed downstream of the filling tube or nozzle is a dividing device having two endless chains, which subdivides the filled case into interconnected string portions. The dividing elements are so arranged on the endless chains that there is only ever one dividing element of an endless chain cooperating with the case and with the dividing element of the other endless chain forms a pair of dividing elements.

Therefore, it would be desirable to provide an apparatus for dividing tubular cases, with which it is possible to generate string portions of differing lengths in a simplified fashion.

SUMMARY

According to one embodiment of the invention, these technical objectives are attained by providing the dividing apparatus with transport elements that are respectively associated with one of their direction-changing regions with the case to be transported. The transport elements have two direction-changing elements wherein the axes of rotation of the two direction-changing elements for the respective transport element extend in a common plane, and the plane is oriented inclinedly at an angle relative to the conveyor direction of the tubular cases. In the production process, therefore during filling of the tubular case, also referred to as the shirred sausage skin or sausage skin casing, only one pair of dividing elements is in engagement with the casing to be divided and constricts in a controlled manner the casing. While that is happening, the portion of the case which is just directly to be filled, disposed upstream of the dividing apparatus in the conveyor direction, is preferably caused to rotate with the filling apparatus and the twisting-off location is produced in the region of the constriction.

The invention is based on the realization that, by virtue thereof only a single pair of dividing elements engages the case and as soon as that pair of dividing elements is moved out of engagement from the case, a relative movement is possible for a predetermined period of time between the tubular case and the transport elements. While the dividing elements of the transport elements are in engagement with the case the speed of movement of the dividing elements at the transport elements corresponds to the conveyor speed of the filled case which is carried away from the filling apparatus. After the pair of dividing elements is no longer in contact with the case the string portion produced is preferably held in position between the mutually opposite transport elements only by the guide parts which are also arranged on the transport elements. To individually adapt the length of the string portion it is possible for the speed of movement of the transport elements and the dividing elements thereon to be altered. In that way the length of the string portions can be adapted within predetermined limits. A structural modification to the transport elements or complicated individual drive of different pairs of transport elements on a transport element, which are to be subjected to high levels of acceleration, namely both positive and negative acceleration, can thus be avoided.

In one aspect, the drive device for the transport elements is adapted to vary the speed of the transport elements with the dividing element when the dividing elements are out of engagement from the case or are brought into engagement with and/or out of engagement from the case. In dependence on the number of dividing elements at a respective transport element and the length of the respective string portions to be produced with the transport elements the speed of the transport elements is adapted by the drive device coupled thereto. In that way either the same dividing element on the transport element or the following dividing element on the transport element can be brought into engagement or contact at precisely the position of the case filled with the pasty material. The case is again constricted and preferably the twisting-off location is then produced. In an embodiment of the invention the change in the speed, e.g., acceleration and deceleration, of the dividing elements relative to the case also takes place in engagement with the case. The speed of the dividing elements can also be altered for example for support purposes when forming the twisting-off location, upon direct entry into (coming into engagement with) and/or upon direct exit from (coming out of engagement with) the case.

In another aspect, the drive device for the transport elements is adapted to speed up or slow down the speed of the transport elements in relation to the conveyor speed of the tubular case. By acceleration, which in the present case is used to denote the increase in speed at the transport element, the same or the subsequent dividing element is brought into contact with the tubular case in such a way that the string portion produced is shorter than the overall periphery of the transport element, with only one dividing element, or the spacing between two adjacent dividing elements on the transport element. By the reduction in the speed of the transport element the dividing element is brought into contact with the tubular case in such a way that the length of the string portion produced is greater than the spacing between two adjacent dividing or the periphery of the transport element with only one dividing element. Shortly before the transport element is brought into engagement or is brought into engagement again the speed of the transport element is to be adapted to the conveyor speed of the filled tubular case. The case and the transport elements are then moved at the same speed.

In a further aspect, the transport elements at both sides of the tubular case are respectively coupled to at least one drive roller of the drive device for a respective transport element. The drive roller for each transport element which is respectively non-rotatably connected to a drive shaft is actuated for example by way of a drive means like for example an electric motor. That provides for synchronous drive of the two transport elements relative to each other. The two dividing elements on the transport elements thus maintain a fixed orientation relative to each other. Displacement of the dividing elements relative to each other can be avoided. Instead of a drive roller, over which each transport element is guided, it is also possible to use synchronizing discs.

In some embodiments, at least two direction-changing elements are used for a respective transport element, wherein at least one direction-changing element is in the form of a drive roller and the other direction-changing elements is in the form of a driven roller. Preferably the axes of rotation of the direction-changing elements on a transport element preferably extend parallel to each other. In addition, the axes of rotation of the direction-changing elements of a transport element also extend parallel to the axes of rotation of the direction-changing elements of the respectively opposite transport element. A preferred embodiment of the invention provides that the axes of rotation of all direction-changing elements of the transport elements extend substantially vertically or at an angle of about up to 35° inclinedly relative to a horizontally extending support surface for the dividing apparatus. The axes of rotation of the direction-changing elements are then preferably inclined at up to about 35° in a plane around the central axis of the case which is moved in the conveyor direction.

In one aspect, the transport elements are respectively associated with one of their direction-changing regions with the case to be transported. The dividing apparatus according to the invention thus contacts the filled case only over the direction-changing regions of the transport elements which are arranged according to the invention. Preferably the axes of rotation of the two direction-changing elements for the transport element extend in a common plane, that plane being oriented inclinedly at an angle relative to the longitudinal axis. Preferably the plane extends transversely relative to the conveyor direction of the tubular case. Both planes of the transport elements are preferably disposed in mirror-symmetrical relationship with the central axis of the filled case.

In another aspect, provided at the transport elements is only one respective dividing element, wherein the remaining periphery of the circulating transport element is formed or filled by guide parts. In another embodiment a plurality of dividing elements is preferably arranged distributed uniformly along the periphery. Arranged between the dividing elements which are disposed at a respective spacing relative to each other are a respective plurality of guide parts, with which a string portion of the tubular case, which is to be divided off or which has already been divided, is further guided in the conveyor direction.

According to an alternative embodiment of the invention, it is provided that the transport elements in their direction-changing regions or with at least one element portion are guided along a path of movement extending substantially parallel to the case. Preferably each transport element has an element portion which is oriented parallel to the case and preferably parallel to the oppositely disposed portion of the other transport element. A dividing element which is guided along that portion of the transport element, after being brought into engagement with the tubular case and the oppositely disposed dividing element of the other transport element, the two forming a pair of dividing elements, involves a predetermined residence time in contact with the case. That portion, along which the pair of dividing elements is guided in contact with the case or moves, is however shorter than the string portion to be produced at the tubular case. In a preferred embodiment the element portion along which the dividing element is guided at the case is less than two thirds of the overall length of the string portion to be produced. In another configuration the element portion corresponds to less than half and particularly preferably less than a third of the overall length of the string portion to be produced.

Each of the circulating transport elements arranged at both sides of the tubular case has at least two direction-changing elements which are preferably arranged at the same spacing relative to the central axis formed by the tubular case. A transport element which is of such a design configuration according to the invention has at least two and preferably three direction-changing regions, wherein each transport element is guided in a direction-changing region over a corresponding direction-changing element.

In some embodiments, a control device is connected in signal-conducting relationship to the drive device and is adapted to actuate the drive device in dependence on the length of the string portions to be produced at the case. By the control device, the drive speed of the drive device driving the transport elements is cyclically increased and/or reduced. A change in the length of the string portions of the sausages to be produced during an ongoing filling operation of a tubular case to be filled by a filling apparatus is possible by way of the control device. That provides for a product change without complicated conversion or modification of the dividing apparatus.

In a further aspect, arranged at the transport elements are a plurality of guide parts in adjacent relationship between two dividing elements or in adjacent relationship beside the one dividing element at the transport elements. The filled case produced by a filling device connected upstream of the dividing apparatus is guided in a controlled manner and for example passed to a subsequent apparatus for further processing thereof, by the guide parts between two dividing elements or adjacent to a dividing element. The string portion to be produced or which has already been produced is held with the guide parts in a predetermined axial orientation with respect to a filling tube of the upstream-disposed filling device. Preferably each guide part is of a configuration adapted to the contour, in particular the diameter, also referred to as the caliber. The guide parts have in particular a semicircular or rhomboidal recess for the tubular case. Two mutually oppositely disposed guide parts of the transport elements of the dividing apparatus according to the invention preferably form an approximately circular free cross-section. The guide parts however are adapted not to clamp or squash the tubular case, so that the transport element with its guide parts can perform a relative movement with respect to the filled tubular case which is preferably produced continuously.

In another aspect, the transport element has a conveyor belt or a conveyor chain at which the dividing elements and/or guide parts are arranged at a mutual spacing. The dividing elements and/or guide parts preferably project perpendicularly at the outside of the transport element which is in the form of a conveyor belt or conveyor chain. The conveyor belt or conveyor chain in the present case forms the main body for the dividing elements and guide parts arranged thereon, that is flexible or elastic. A toothed belt for example can also be used as the conveyor belt. The inwardly facing teeth of the toothed belt mesh with the direction-changing elements of a corresponding configuration, thereby providing that the transport elements do not involve any slippage relative to the drive device. That ensures exact actuation of the transport elements and the production linked thereto of the string portions on the tubular case. Preferably the transport elements on the mutually opposite sides of the filled tubular case to be produced are driven in opposite relationship or in the opposite direction.

In yet another aspect, the dividing elements and/or guide parts are reversibly coupled and secured to the transport elements. In that way it is possible to arrange the dividing elements at a predetermined spacing relative to each other along the transport element. As a result, if necessary the basic setting of the spacing between the dividing elements relative to each other can be matched to the string portions to be produced at the tubular case filled with the pasty material. In the present case the term reversible coupled connection between the dividing elements or the guide parts and the transport elements denotes that the dividing elements and/or the guide parts can be fitted to the transport elements as often as may be desired and can also be taken off or removed again accordingly.

In an embodiment of the invention, the dividing elements and/or guide parts are coupled to the transport elements by way of a positively locking connection, which simplifies coupling or connecting and uncoupling or releasing the guide parts and/or dividing elements on the transport element. The dividing elements or guide parts and the transport element preferably have latching parts or elements which correspond or can be brought into operative connected relationship with each other. Preferably a kind of snap-action connection is afforded by the latching parts or elements.

In one aspect, the dividing elements of a pair of dividing elements which cooperate with each other, of the transport elements arranged at the mutually opposite sides of the tubular case, have cooperating dividing portions which are arranged interlaced with respect to each other. The dividing elements, preferably projecting substantially perpendicularly to the transport element, of a cooperating pair, respectively have dividing portions which are oriented inclined at an angle relative to the vertical. The dividing portions of both dividing elements extend at an angle of preferably 20° to 90° relative to each other. The dividing elements engage with their dividing portions into each other in such a way that regions of the dividing portions, as viewed in the conveyor direction, cover each other over without however directly contacting each other. Particularly at the point of intersection of the dividing portions they form a free cross-section for the case, which is admittedly to be constricted but not damaged, of the string of sausages comprising a plurality of successively arranged string portions.

In a further configuration of the dividing apparatus according to the invention, there is provided at least one conveyor device connected downstream of the pair of transport elements and having two conveyor elements. By the conveyor device arranged downstream of the pair of transport elements in the conveyor direction the string portions of the continuously produced string of sausages are taken over and transferred to a further processing device, for example a separating device or a sorting or packaging station. The dividing apparatus according to the invention can preferably be a component part of a production line for the production of separated individual sausages. The conveyor elements of the conveyor device are in the form of circulating conveyor belts in an embodiment of the invention. The conveyor elements of the conveyor device are arranged at a predetermined spacing relative to each other, between which the string portions which are produced and which are preferably still connected together are carried away. The spacing between the conveyor elements and between the transport elements is preferably adjustable or variable, whereby adaptation to different diameters or calibers of the strings of sausages to be produced is possible.

A further aspect of the invention concerns a machine for producing sausages of pasty material, in particular minced meat, comprising a filling hopper for receiving the pasty material, a conveyor pump for conveying the pasty material, a filling device for filling tubular cases with a pasty material, in particular sausage skin casings with sausage meat, an apparatus for dividing up tubular cases filled with the pasty material according to one of the above-described preferred embodiments.

The dividing apparatus of this invention makes it possible to produce strings of sausages of differing lengths without having to structurally modify or convert the transport elements of the dividing apparatus, that are used for dividing the string portions. This provides for simplified adaptation of the machine according to the invention to products of different lengths. In an embodiment of the invention the machine according to the invention can be used variably by the dividing apparatus in such a way that the sausage lengths can be varied or adjusted during an ongoing production process. Adaptation is possible for example by way of a control device which is connected to the dividing apparatus in signal-conducting relationship and which in an embodiment of the invention can be a component part of the machine according to the invention. Central control or setting of given processes controlling the machine like for example setting the conveyor speed of the pasty material to be introduced into the tubular case is conducted by way of the control device.

In another aspect, there is provided preferably at least one sausage casing loading unit for the gathered tubular cases, also referred to as sausage skin casings, having two gripping elements which are held moveably relative to each other. Automated loading of the filling device, in particular a filling tube on the filling device, is conducted by the loading unit. To be able to uniformly grip the casings the gripping elements receiving the gathered cases are preferably mounted rotatably at at least one lever element or are carried by way of a stroke linkage in linear and parallel relationship variably relative to each other in respect of height. These various aspects and embodiments can be combined in any combination, so long as the dividing apparatus achieves the technical advantages described above.

Advantageous embodiments of the machine for producing sausages are to be found in the foregoing description relating to the dividing apparatus according to the invention and the preferred embodiments thereof.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitutes a part of this specification, illustrate one or more embodiments of the invention and, together with the general description given above and the detailed description given below, explain the one or more embodiments of the invention.

DETAILED DESCRIPTION

Figure 1:
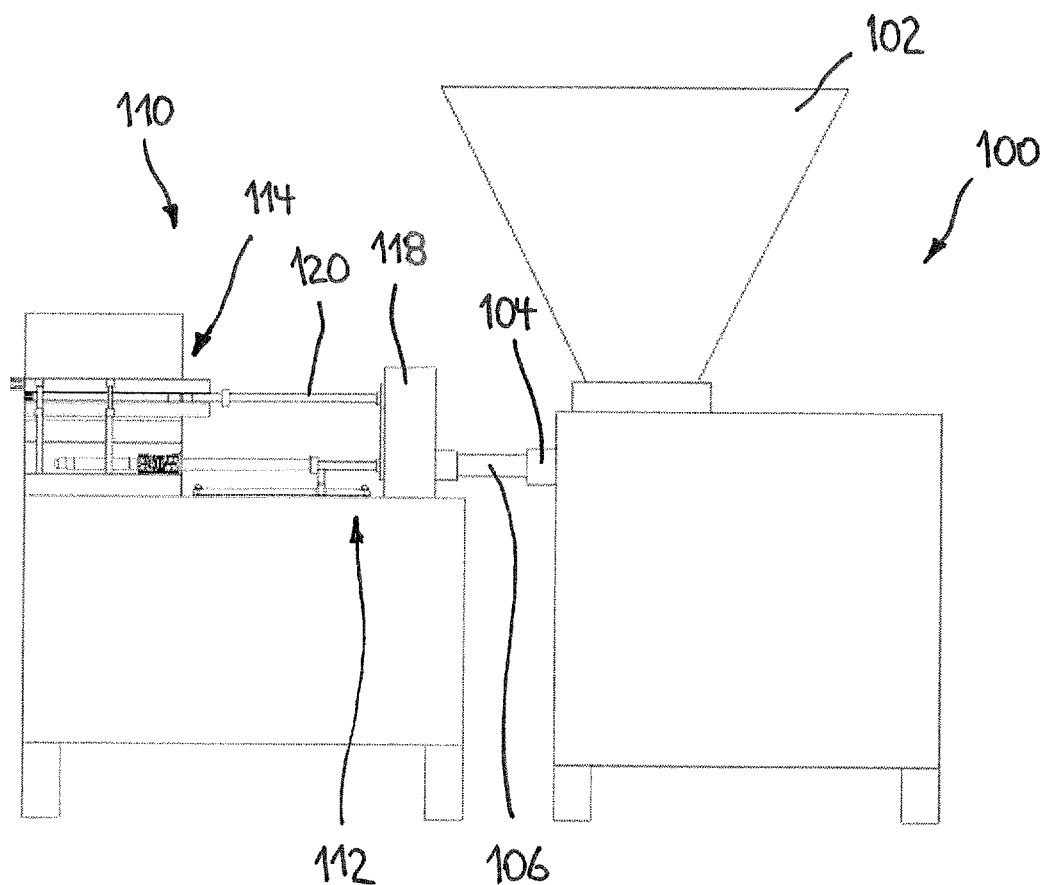
FIG. 1 shows a front view of a machine for producing sausages having a dividing apparatus according to one embodiment of the invention.
Figure 2:
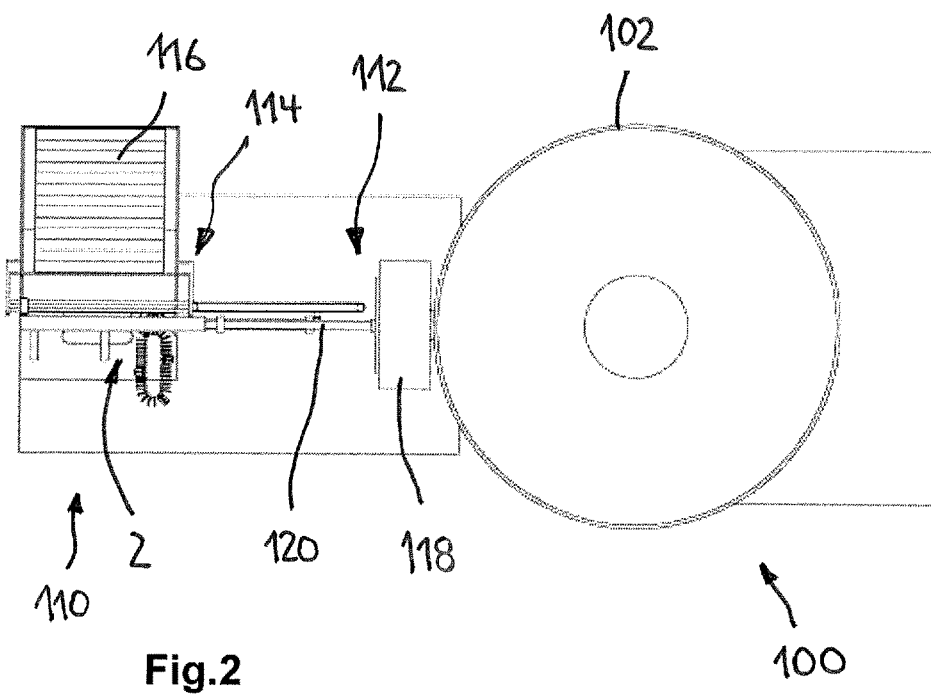
FIG. 2 shows a plan view of the machine of FIG. 1.

FIGS. 1 and 2 show a machine 100 for filling tubular cases, in particular artificial or natural skin casings. The machine 100 has a filling hopper 102 and an extrusion head 104. The machine 100 is coupled to an attachment device 110 by way of a delivery tube 106. The pasty material, in particular a meat product, is transferred by way of the delivery tube 106 from the extrusion head 104 to a filling device 112 at the attachment 110. The attachment 110 further includes a casing loading unit 114 with which the filling device 112 can be equipped with gathered cases 116. Also arranged at the attachment 110 is a dividing apparatus 2, by which a tubular case 4 produced at the filling device 112 and filled with the pasty material is subdivided into string portions 6 of predetermined length.

Figure 3:
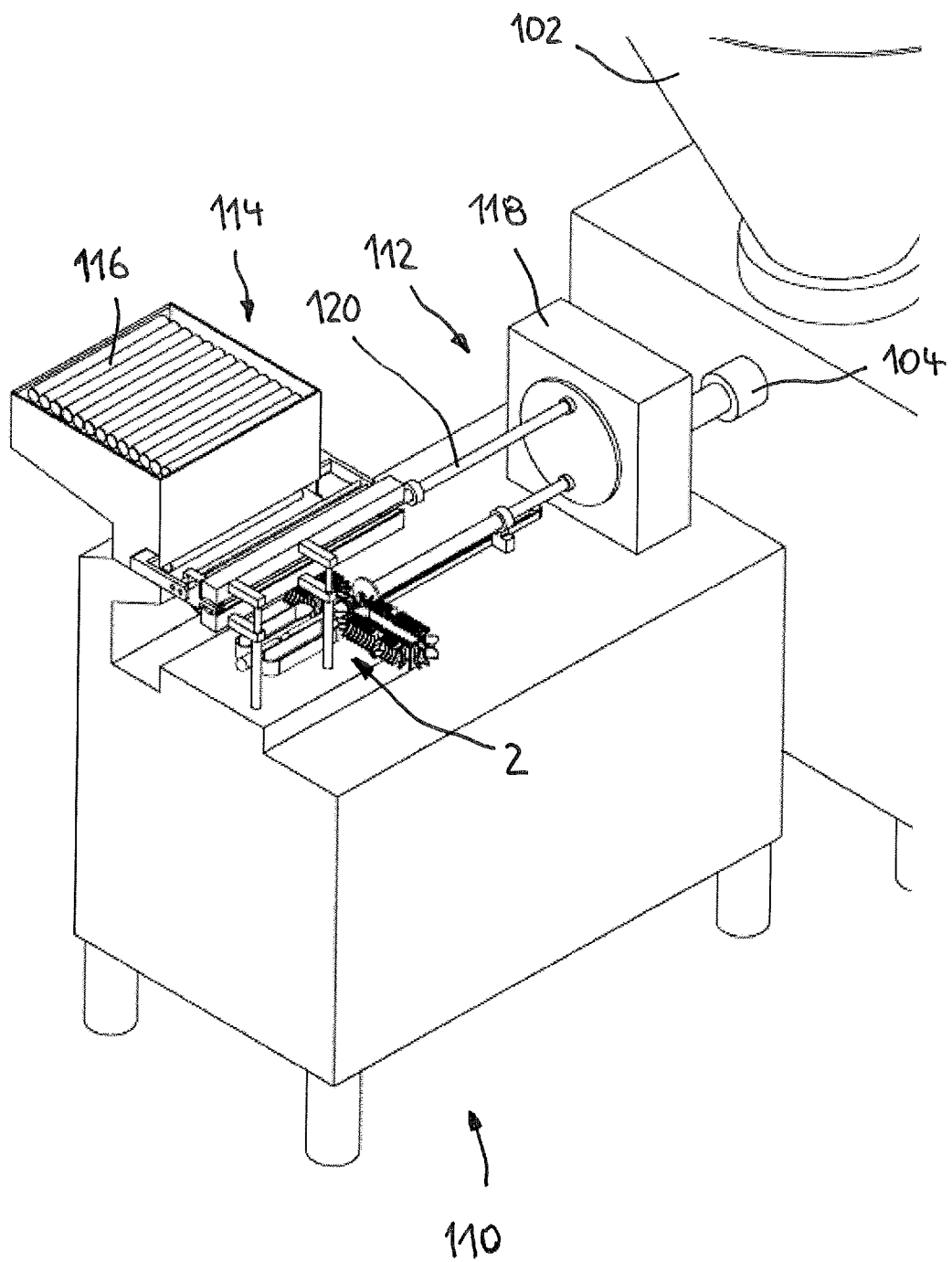
FIG. 3 shows a perspective view of the machine having the dividing apparatus of FIG. 1.

FIG. 3 shows the attachment 110 coupled to the machine 100, with the filling device 112 for filling tubular cases 4. In the illustrated embodiment the cases are filled with a pasty material produced from a meat product to produce sausages of predetermined length. For that purpose, the filling device 112 includes a twisting-off head 118 in the form of a rotary magazine, with two filling tubes 120 arranged thereon. The filling tube 120 in the upper position is equipped with gathered cases 116 by way of the loading unit 114. The filling tube 120 which is in the lower position and on which the gathered case 116 is drawn is then preferably continuously filled with the meat product passed from the machine 100 to the filling device 112. Associated with the filling tube 120 when in the filling position, downstream of the filling tube in the longitudinal direction, is the dividing apparatus 2 from which the filled tubular case is transferred immediately after having been filled. Preferably the dividing apparatus 2 is oriented concentrically with respect to the longitudinal axis of the filling tube when in the filling position.

Figure 4:
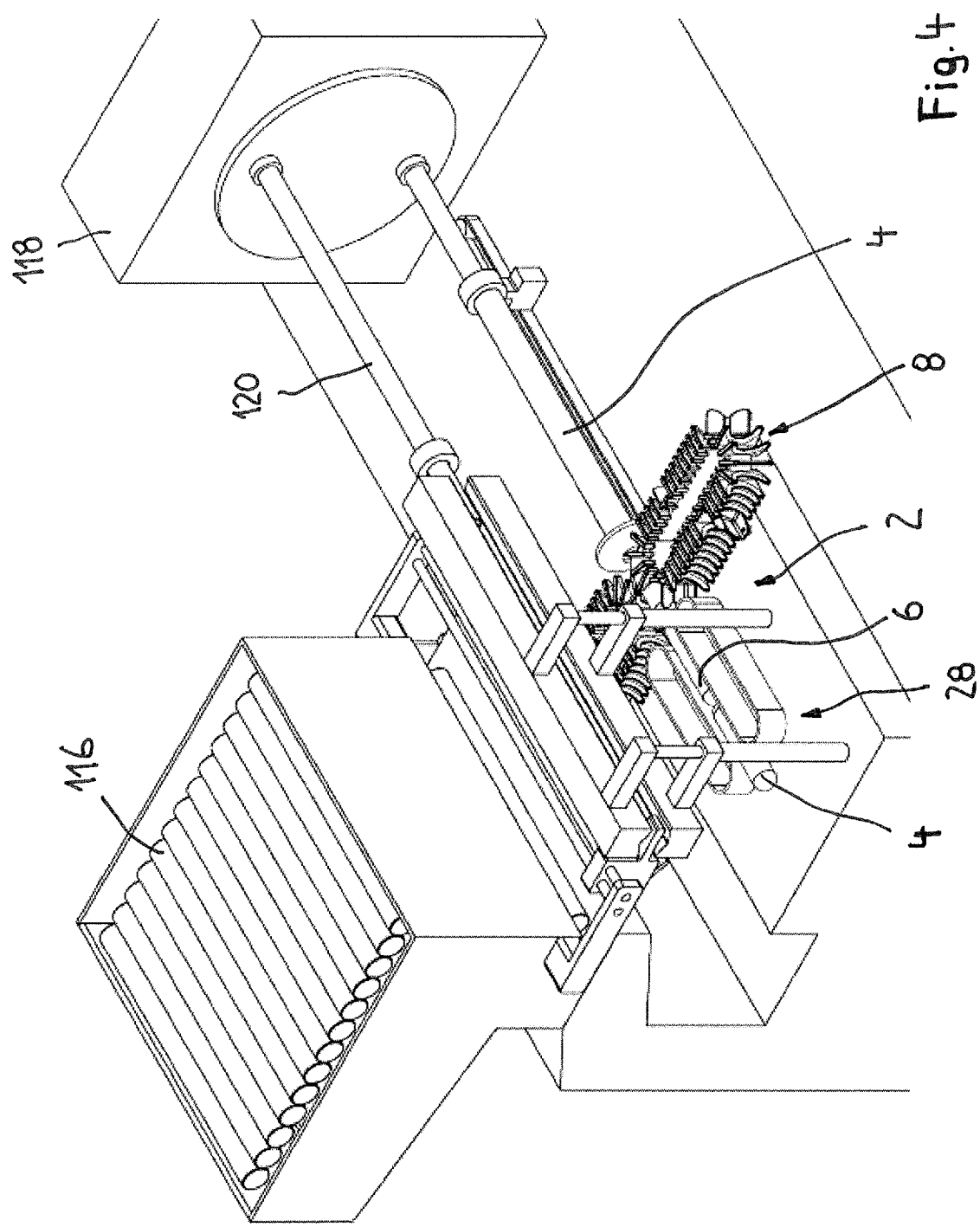
FIG. 4 shows a portion of the machine and the dividing apparatus of FIG. 3.

As can be seen from the portion of FIG. 3 shown in FIG. 4 the dividing apparatus 2 has two circulating transport elements 8, 8' which are arranged on mutually opposite sides of the filled case 4 produced by the filling device 112. The transport elements each have one or more dividing elements 10, 10' and a plurality of guide parts 12, 12' for the filled case. The transport elements 8, 8' of the dividing apparatus 2 are driven by way of a drive device (not shown), with the transport elements 8, 8' being respectively moved or driven in opposite directions. In that way the transport elements disposed on mutually opposite sides of the case produce a synchronous conveying movement as indicated by the arrow 14 (FIG. 5) of the filled case 4. In addition, there is at least one conveyor device 28 connected downstream of the pair of transport elements 8, 8' and having two conveyor elements 30.

The dividing elements 10, 10', wherein one dividing element 10 on the transport element 8 is oriented with the oppositely disposed dividing element 10' on the transport element 8' in such a way that they cooperate with each other and produce a constriction 16 at the filled case 4, constitute a respective pair of dividing elements.

Figure 5:
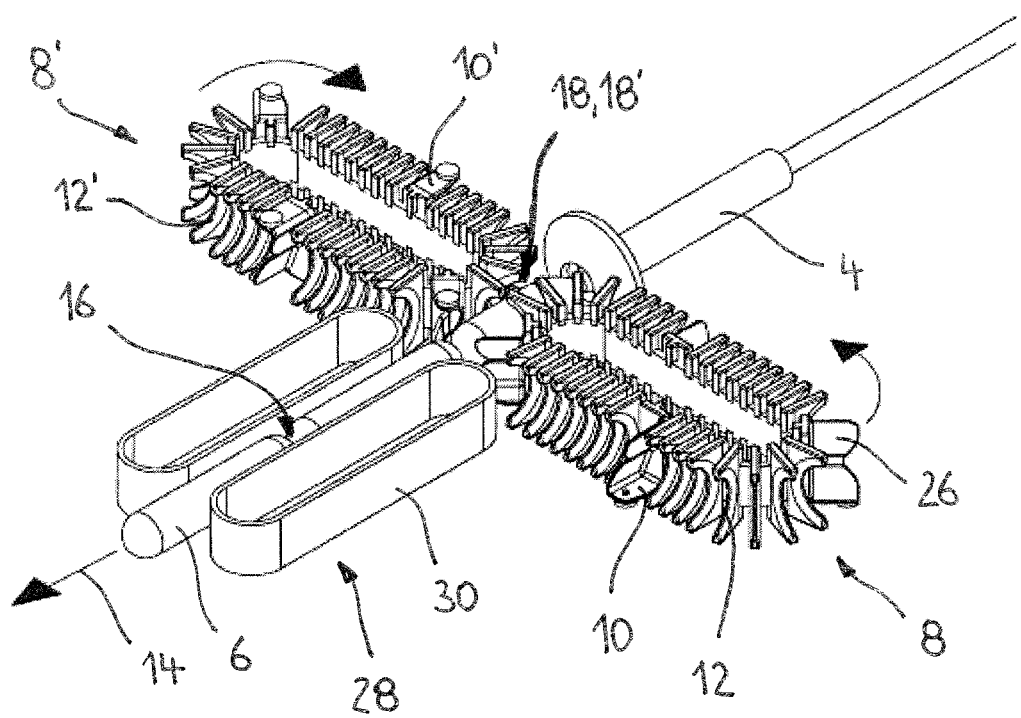
FIG. 5 shows a perspective view of a first embodiment of the dividing apparatus that may be used with the machine of FIG. 1.

FIG. 5 shows a first embodiment of the apparatus 2 according to the invention for dividing tubular cases 4. In this case the dividing elements 10, 10' on the transport elements 8, 8' are so arranged and in addition the transport elements 8, 8' are so guided along the filled case 4 to be divided that in each case only one pair of dividing elements can be simultaneously brought into engagement with the case 4. By virtue thereof, when the dividing elements 10, 10' are out of engagement with the case 4, the speed of the transport elements 8, 8' with their dividing elements can be varied by the drive device for the transport elements. The guide parts 12, 12' serve predominantly for guiding the filled case 4, wherein the guide parts 12, 12' neither clamp the case nor fix it in any way. This therefore permits relative movement between the transport elements 8, 8' and the filled case 4 which is conveyed at a predetermined and in particular invariable speed. The drive device for the transport elements 8, 8' provides that the speed thereof is accelerated or decelerated in relation to the conveyor speed of the tubular filled case 4 after as a priority none of the dividing elements 10, 10' is in contact or in engagement with the case. In an embodiment of the invention slight acceleration of the dividing elements 10, 10' relative to the case 4 is also possible even in engagement with the case 4, with the dividing elements 10, 10' according to the invention. By virtue thereof the case is drawn slightly in the conveyor direction to promote the formation of a twisting-off location.

Figure 6A:
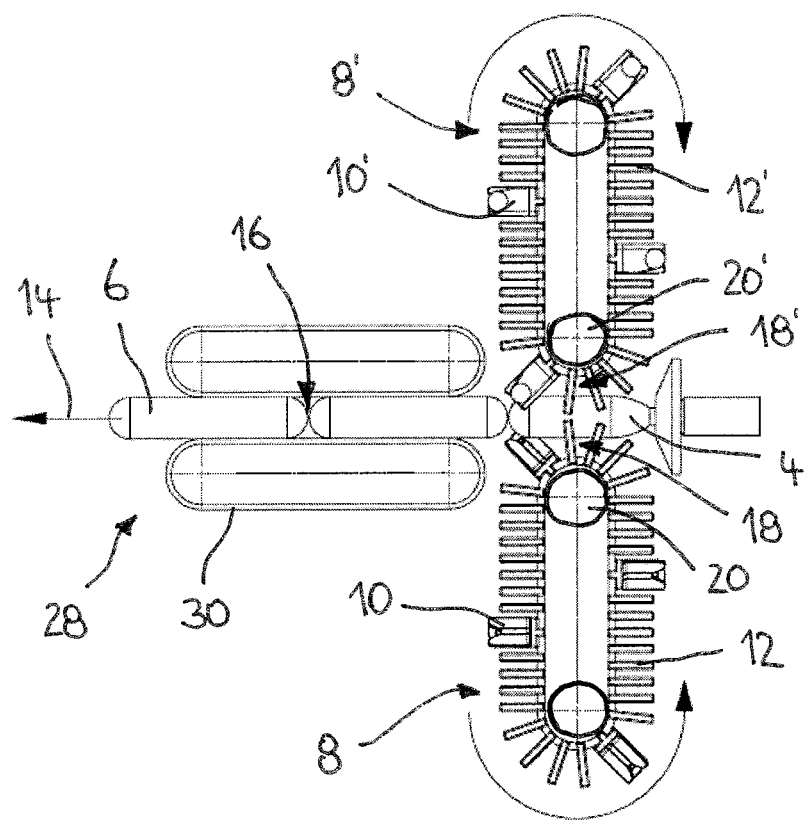
FIG. 6a shows a top view of the dividing apparatus of FIG. 5 in a first step of processing.
Figure 6B:
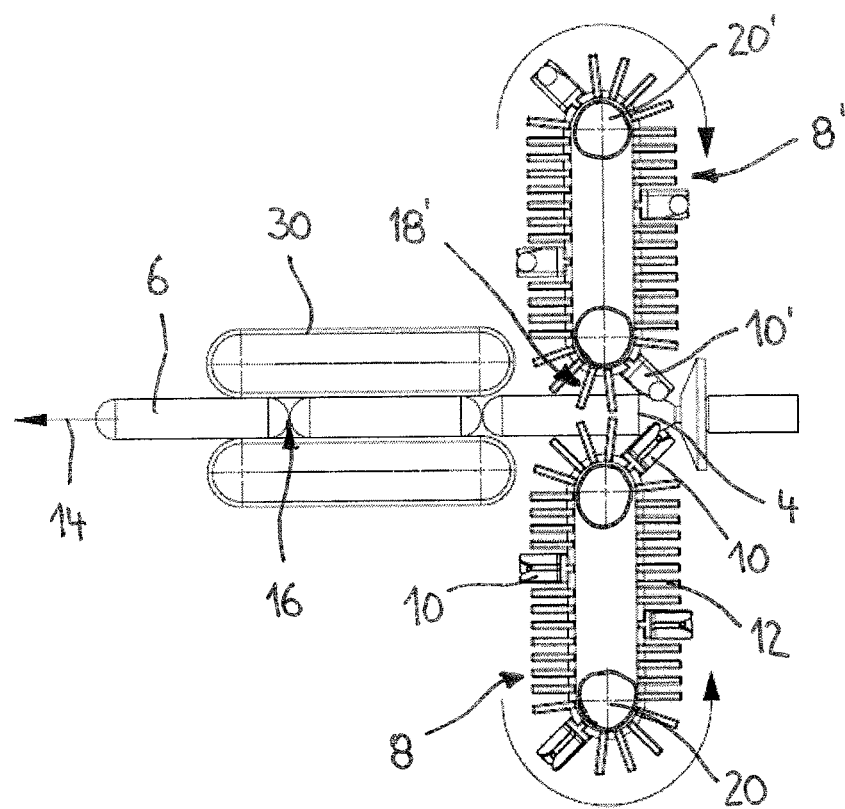
FIG. 6b shows a top view of the dividing apparatus of FIG. 6a moved to a second step of processing.

As clearly shown in FIGS. 5 through 6b in the present embodiment the transport elements 8, 8' are respectively associated only with a direction-changing region of the case 4 to be subdivided. In this embodiment a respective pair of dividing elements come into contact or engagement with the case only for a short time, in which respect the closest contact between the pair of dividing elements relative to the case to be divided is at the apex point of the direction-changing movement of the transport element, e.g., when the dividing elements are substantially perpendicularly to the case 4. To move the transport elements 8, 8' along the case 4 shown in FIGS. 5 through 6b the transport elements 8, 8' are guided over at least two direction-changing elements 20 20'. One of the direction-changing elements is in the form of a drive roller for driving a respective transport element 8, 8'.

FIGS. 6a and 6b show various positions of the dividing elements 10, 10' on the transport element 8, 8' and thus different moments in time during production of the divided string portions 6 of the filled case 4, that are to be produced. FIG. 6a shows the moment at which one of the pairs of dividing elements, arranged on the transport elements 8, 8', is brought out of engagement with the case 4. From that moment, irrespective of the length to be produced in respect of the string portion, the transport elements 8, 8' can be driven independently of the conveyor speed of the filled case. FIG. 6b shows the moment shortly before the next dividing elements 10, 10' of the transport elements 8, 8' are brought into contact with the filled case, wherein at that moment in time the speed of the transport elements was then again adapted to the conveyor speed of the filled case 4.

Figure 7:
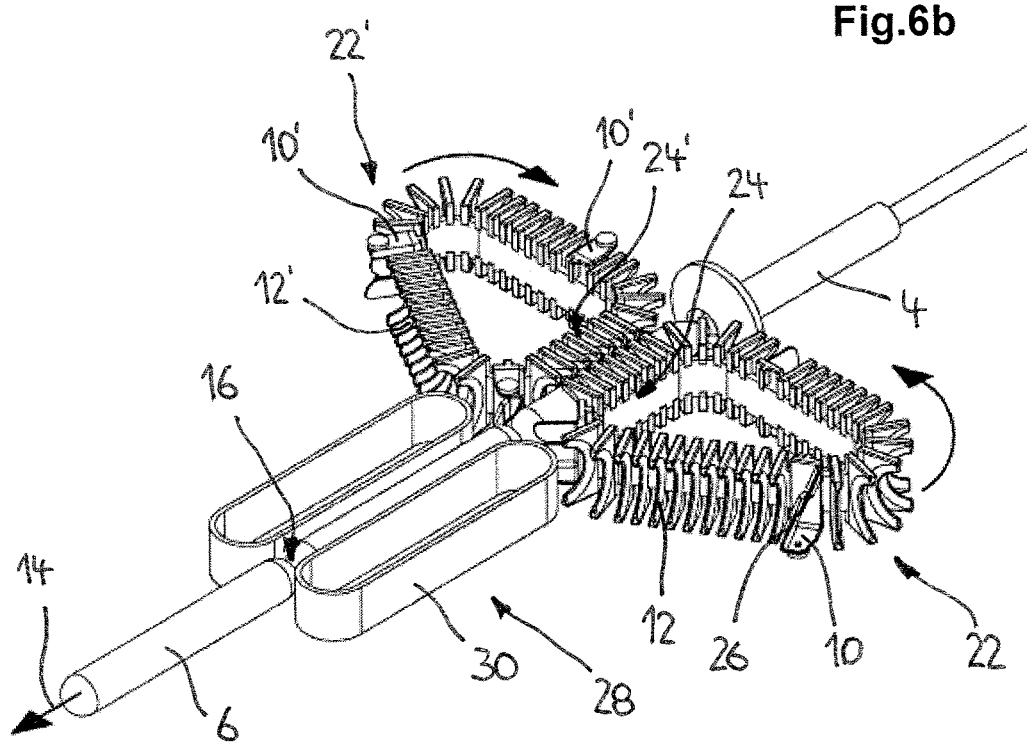
FIG. 7 shows a perspective view of a second embodiment of the dividing apparatus that may be used with the machine of FIG. 1.

FIG. 7 shows a further embodiment of the dividing apparatus 2' according to the invention, which in contrast to the previous embodiment has two transport elements 22, 22' which respectively have an element portion 24, 24' which is guided substantially parallel to the conveyor direction of the case 4 to be filled. In this embodiment therefore each of the dividing elements 10, 10' arranged on the transport elements 22, 22' and each guide part 12, 12' is guided over a predetermined distance or a path portion in parallel with the case 4. The dividing elements 10, 10' and the guide parts 12, 12' are reversibly coupled/arranged on the transport elements 20, 20' and also the transport elements 8, 8' (FIGS. 5 through 6b). This means that the dividing elements 10, 10' are variable in the spacing relative to each other on the transport elements 22, 22'. That permits basic setting of the length of the string portions 6 on the case 4, that can be produced with the transport elements 22, 22'.

Adaptation of the speed of the drive device and the transport elements 22, 22' coupled thereto is conducted by way of a control device (not shown) formed or provided at the dividing apparatus 2, 2' according to the invention. As can further be seen from FIG. 7 the dividing elements 10, 10' have dividing portions 26 extending inclinedly at an angle to the vertical. In particular the angle can be between 10° and 45° relative to the vertical. The dividing elements 10, 10' on the transport elements 8, 8', 20, 20' have a dividing portion which, when the dividing elements 10, 10' are in opposite relationship, therefore forming a pair of dividing elements, is inclined in the opposite direction. The dividing portions 26 on the dividing elements 10, 10' are thus preferably arranged in mutually interlaced relationship and thus effectively cooperate.

Figure 8A:
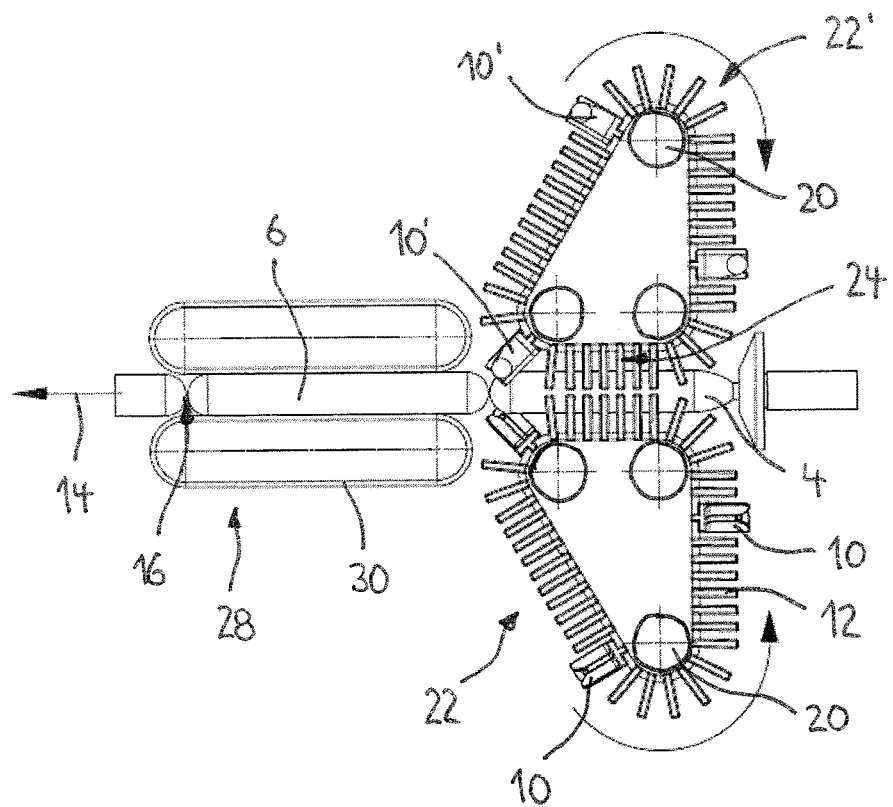
FIG. 8a shows a top view of the dividing apparatus of FIG. 7 in a first step of processing.
Figure 8B:
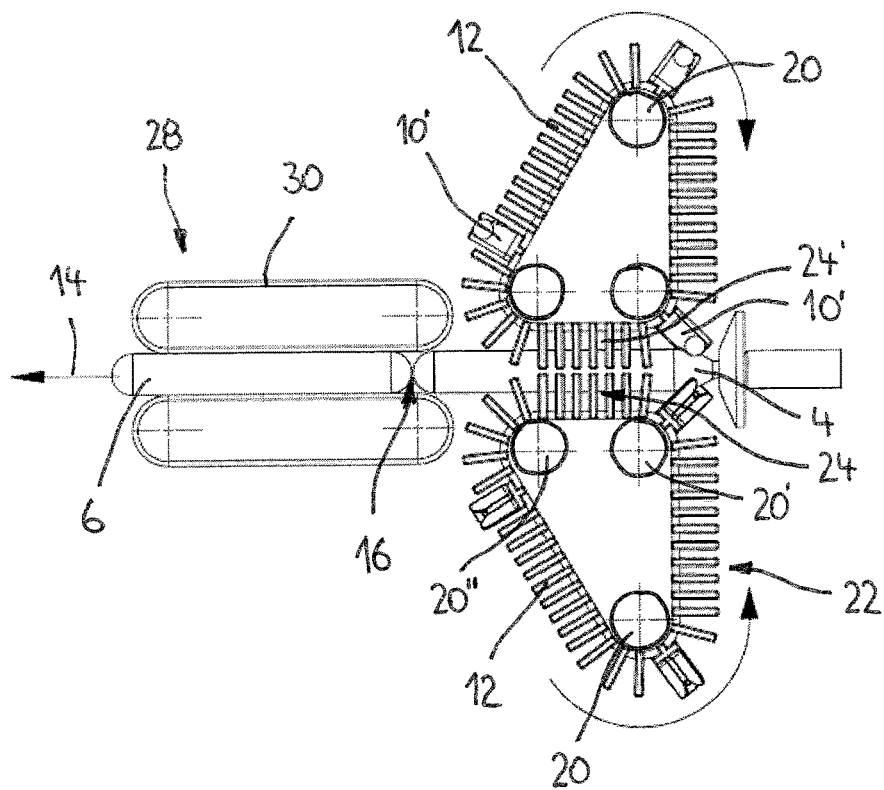
FIG. 8b shows a top view of the dividing apparatus of FIG. 8a moved to a second step of processing.

It will also be seen from FIGS. 8a and 8b that only one pair of dividing elements 10, 10' is respectively in engagement with the case 4. Before the next pair of dividing elements 10, 10' on the transport elements 20, 20' is brought into engagement with the case, there is a moment in time at which exclusively only guide parts 12, 12' on the transport elements are in contact with or bear against the case 4. The transport elements 20, 20' of the embodiment of the dividing apparatus 2' shown in FIGS. 8a and 8b are guided over three direction-changing elements 20, 20', 20", wherein one of those elements is preferably in the form of a drive roller or drive pulley. The drive roller or drive pulley is actuated by the drive device.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

LIST OF REFERENCES

2, 2' dividing apparatus
4 case
6 string portion
8, 8' transport element
10, 10' dividing element
12, 12' guide part
14 conveyor direction 16 constriction
18, 18' direction-changing region
20, 20' direction-changing element
22, 22' transport element
24, 24' element portion
26 dividing portion
28 conveyor device
30 conveyor elements
100 machine
102 filling hopper
104 extrusion head
106 delivery tube
110 attachment
112 filling device
114 loading unit
116 gathered case
118 twisting-off head
120 filling tube

What is claimed is:

1. An apparatus for dividing up tubular cases which are filled with a pasty material, comprising:
    two circulating transport elements arranged on mutually opposite sides of the case, wherein the transport elements respectively include one or more dividing elements, and
    at least one drive device for the transport elements,
    wherein the dividing elements are so arranged at the transport elements and the transport elements are so guided along the case that only one pair of dividing elements can be simultaneously brought into engagement with the case,
    wherein the transport elements have two direction-changing elements defining direction-changing regions for the transport elements, each of the direction-changing elements having an axis of rotation, wherein the transport elements are positioned such that only one of the direction-changing regions of each of the transport elements is respectively associated with the case to be transported, and
    wherein the axes of rotation of the two direction-changing elements for each of the transport elements extend in a respective common plane, wherein the planes defined by the axes of rotation for both of the transport elements are each oriented inclinedly at an angle relative to a conveyor direction of the tubular cases.

2. The dividing apparatus of claim 1, wherein the drive device for the transport elements is adapted to vary a speed of the transport elements with the dividing element when the dividing elements are out of engagement with the case or are brought into and/or out of engagement with the case.

3. The dividing apparatus of claim 1, wherein the drive device for the transport elements is adapted to speed up or slow down the speed of the transport elements in relation to the conveyor speed of the tubular case.

4. The dividing apparatus of claim 1, wherein the direction-changing elements of the transport elements include a drive roller for each respective transport element.

5. The dividing apparatus of claim 1, wherein the transport elements are guided in respective direction-changing regions along a path of movement extending substantially parallel to the case.

6. The dividing apparatus of claim 1, further comprising:
    a control device which is connected in signal-conducting relationship to the drive device and which is adapted to actuate the drive device in dependence on a length of string portions to be produced at the case.

7. The dividing apparatus of claim 1, wherein arranged at the transport elements are a plurality of guide parts in adjacent relationship between two dividing elements or in adjacent relationship beside the one dividing element at the transport element.

8. The dividing apparatus of claim 1, wherein the transport element has a conveyor belt or a conveyor chain at which the dividing elements and/or guide parts are arranged at a mutual spacing.

9. The dividing apparatus of claim 1, wherein the dividing elements and/or guide parts are reversibly coupled and secured to the transport elements.

10. The dividing apparatus of claim 1, wherein the dividing elements of a pair of dividing elements have dividing portions which are arranged in mutually interlaced relationship.

11. The dividing apparatus of claim 1, further comprising:
    at least one conveyor device having two conveyor elements that is disposed downstream of the transport elements.

12. The dividing apparatus of claim 1,
    wherein the drive device for the transport elements is adapted to vary a speed of the transport elements with the dividing element when the dividing elements are out of engagement with the case or are brought into and/or out of engagement with the case,
    wherein the drive device for the transport elements is adapted to speed up or slow down the speed of the transport elements in relation to the conveyor speed of the tubular case,
    wherein the transport elements are respectively coupled to at least one drive roller for a respective transport element,
    wherein the transport elements are guided in respective direction-changing regions along a path of movement extending substantially parallel to the case,
    the dividing apparatus further comprising a control device which is connected in signal-conducting relationship to the drive device and which is adapted to actuate the drive device in dependence on a length of string portions to be produced at the case,
    wherein arranged at the transport elements are a plurality of guide parts in adjacent relationship between two dividing elements or in adjacent relationship beside the one dividing element at the transport element,
    wherein the transport element has a conveyor belt or a conveyor chain at which the dividing elements and/or guide parts are arranged at a mutual spacing,
    wherein the dividing elements and/or guide parts are reversibly coupled and secured to the transport elements,
    wherein the dividing elements of a pair of dividing elements have dividing portions which are arranged in mutually interlaced relationship, and
    the dividing apparatus further comprising at least one conveyor device having two conveyor elements that is disposed downstream of the transport elements.

13. A machine for producing sausages of pasty material, comprising:
    a filling hopper for receiving the pasty material,
    a conveyor pump for conveying the pasty material,
    a filling device for filling tubular cases with a pasty material,
    an apparatus for dividing up tubular cases filled with the pasty material as set forth in claim 1, and at least one casing loading unit for gathered cases having two gripping elements which are held moveably relative to each other.

* * * * *